United States Patent [19]

Arditty et al.

[11] Patent Number: 4,547,650
[45] Date of Patent: Oct. 15, 1985

[54] DEVICE FOR HEATING AN ANNULAR SURFACE ZONE OF A THREADLIKE OBJECT

[75] Inventors: Hervé Arditty, Marly le Roi; Philippe Graindorge, Magny les Hameaux, both of France

[73] Assignee: Thomson-CSF, Paris, France

[21] Appl. No.: 559,247

[22] Filed: Dec. 8, 1983

[30] Foreign Application Priority Data

Dec. 10, 1982 [FR] France ................. 82 20768

[51] Int. Cl.⁴ .............................................. B23K 26/06
[52] U.S. Cl. ................ 219/121 LE; 65/13; 219/121 LQ; 219/121 FS
[58] Field of Search ..... 219/121 L, 121 LM, 121 LE, 219/121 LF, 121 LP, 121 LQ; 65/13

[56] References Cited

U.S. PATENT DOCUMENTS 3,865,564 2/1975 Jaeger et al. ............. 219/121 LF X
4,058,699 11/1977 van Vloten ............... 219/121 LE X
4,263,495 4/1981 Fujita et al. .................. 219/121 LD

FOREIGN PATENT DOCUMENTS 2432538 1/1976 Fed. Rep. of Germany .
2267987 11/1975 France .
2323646 4/1977 France .

*Primary Examiner*—C. L. Albritton
*Attorney, Agent, or Firm*—Oblon, Fisher, Spivak, McClelland & Maier

[57] ABSTRACT

A heating device including a carbon dioxide laser beam directed towards a spherical mirror and then directed from an ellipsoidal mirror so as to concentrate the energy of said laser on a surface ring of a threadlike object.

10 Claims, 4 Drawing Figures

DEVICE FOR HEATING AN ANNULAR SURFACE ZONE OF A THREADLIKE OBJECT

BACKGROUND OF THE INVENTION

1. Field of the Invention

The invention relates to a device for heating an annular surface zone of a threadlike object.

The field of the invention is in particular that of splicing optical fibers for connecting optical fibers together.

2. Description of the Prior Art

Splicing two optical fibers together consists in effecting a weld between the ends of these fibers, correctly cut, aligned and positioned face to face, for example in a V guide. By heating for a few fractions of a second at a temperature of 2000° C., the ends are melted and welded together. The heat source may be of three types: an electric arc formed between two electrodes, possibly controlled by a gas plasma, a micro oxhydric blowtorch or a carbon dioxide ($CO_2$) laser.

For heating an annular surface zone of a threadlike object, for example an optical fiber, which corresponds to the problem which the invention seeks to resolve, a heating zone must be obtained whose contours are defined with great accuracy, which was not the case with the devices of the prior art. In the rest of the specification, the example of a fiber will be more particularly considered.

The device of the invention allows pin-point melting of the fiber with very low laser powers. It further allows good symmetry of resolution of the heated zone to be obtained.

SUMMARY OF THE INVENTION

The invention provides a device for heating an annular surface zone of a threadlike object, comprising a carbon dioxide laser delivering a parallel beam, a hollow body having an axis of symmetry, comprising an inner enclosure, means for causing this threadlike object to travel along a travel axis merging with said axis symmetry, an object cylindrical in shape with axis of symmetry merging with said travel axis, pierced with a bore along this axis to allow the threadlike object to travel therethrough and comprising a slanting bearing surface which is a reflecting surface for the beam from the laser, disposed at one end of said hollow body and fixed to the internal walls of said body, an ellipsoidal mirror with axis of symmetry merging with said travel axis pierced along said axis to allow the threadlike object to pass therethrough, disposed at a second end of the hollow body fixed to the internal walls of this body and comprising first and second conjugate foci, the second of which is situated on the travel axis, means for focussing the beam from the laser at the first focus of the ellipsoidal mirror and the parallel beam from this laser has a direction perpendicular to the travel axis of said threadlike object and included in a plane perpendicular to said slanting bearing surface, so that said beam after focussing by the focussing means and after reflection by said slanting bearing surface and the walls of said ellipsoidal mirror is focussed at the second focus of said mirror situated on the travel axis of said threadlike object.

BRIEF DESCRIPTION OF THE DRAWINGS

Other features and advantages of the invention will appear from the following description, with reference to the accompanying figures in which.

DESCRIPTION OF THE PREFERRED EMBODIMENTS

In the device of the invention, a laser is used whose beam is directed on a parabolic (or spherical) mirror, then reflected from an ellipsoidal mirror for concentrating the energy on a ring situated at the periphery of the threadlike object.

In the rest of this description this threadlike object will be taken, by way of example, as being an optical fiber.

In the rest of the specification a carbon dioxide ($CO_2$) type laser will be used, whose radiation wavelength is 10.6 micrometers. In fact, such a laser presents the following advantages: the possibility of melting the silica fiber without depositing impurities in the melting zone and the possibility of precisely controlling the focussing of the beam at the position of the zone to be heated and the energy density emitted by said laser.

In fact, for this wavelength of 10.6 micrometers, the fiber is no longer transparent, it is opaque and the heat which is that obtained for the outer skin of the fiber is then propagated inside this latter, which means that high emitted powers are not required.

With this device then the fiber may be melted with very low laser powers, for example less than 10 watts, with good symmetry of revolution of the heated zone.

Figure 1:
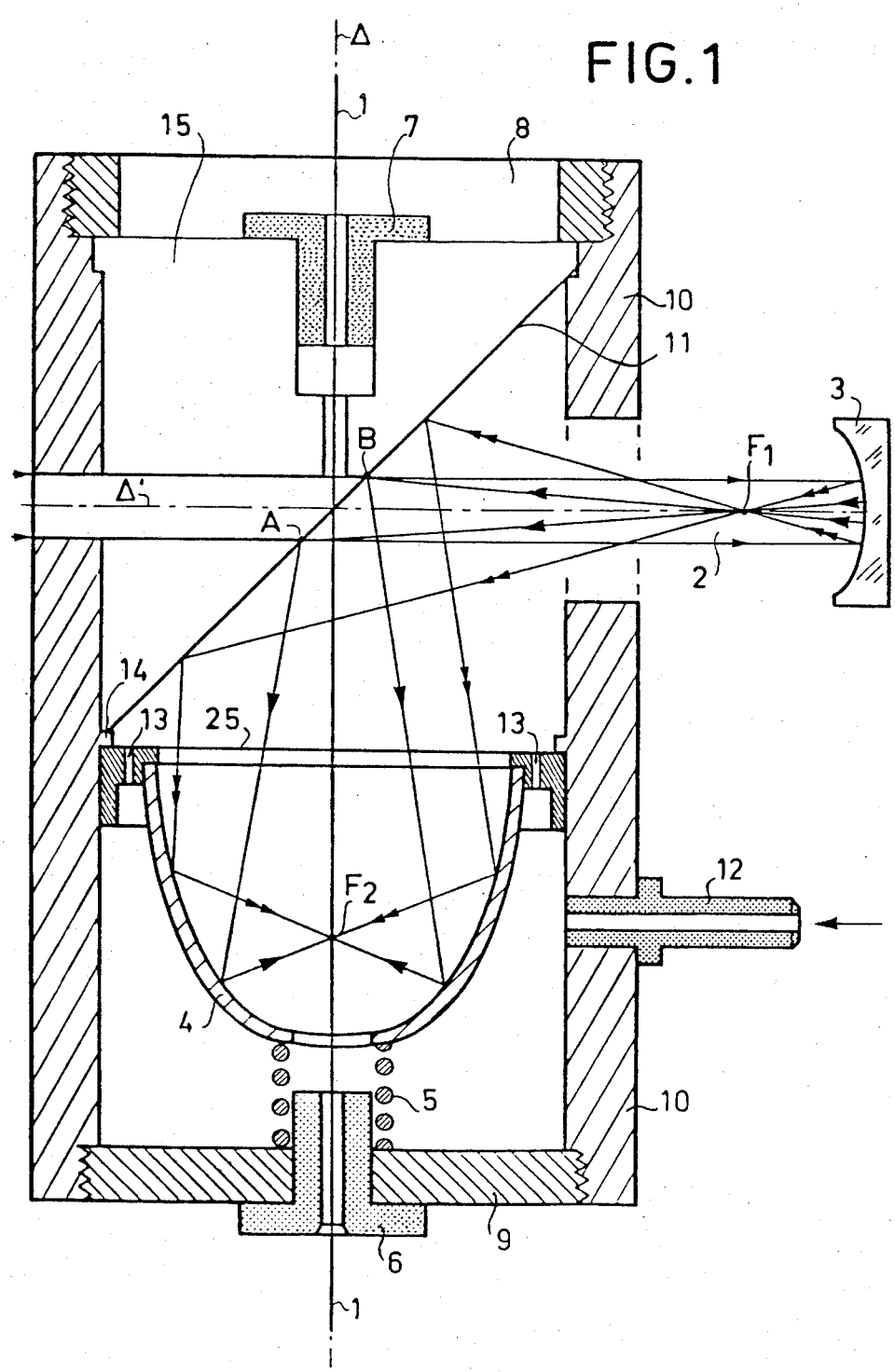
FIG. 1 illustrates the device of the invention.

The device of the invention comprises a hollow body 10 comprising an inner enclosure in which a cylindrical shaped object 15 is fixed to one of its ends. In FIG. 1, this object 15 is fixed by way of example by a ring 8 which screws into the hollow body 10, for example having a tubular shape.

This ring 8 is a ring for fixing the cylindrical shaped object 15, which is also fixed against a small shoulder 14 situated on the inner wall of the tubular shaped body 10.

The cylindrical shaped circuit 15 has a slanting bearing surface 11 which is a reflecting surface. This object 15 is pierced along its axis of symmetry by a passage in which an optical fiber 1 may travel. A guide 7 defining an orifice whose walls are made from polytetrafluorethylene prevents damage to said fiber due to friction.

In fact, polytetrafluorethylene has an extremely low friction coefficient: it is for example 0.04 on polished steel, and is self-lubricating and anti-adhesive. In comparison, and used under the same conditions, rubber or neoprene have friction coefficient of about 0.8.

On the other side of this tube is fixed, for example by screwing, a cylindrical element which has in its center of symmetry a second guide 6 defining an orifice having walls made from tetrafluoroethylene through which the fiber also travels. This element supports a spring 5 which itself supports an elliptical mirror which is pierced with an aperture at its center so as to let the optical fiber pass therethrough and which is connected to the internal walls of the hollow body 10 by an element 25 which has holes 13 allowing the gas introduced by the ventilation orifice 12 to flow.

These different parts define an axis of symmetry such that the tubular shaped hollow body, the cylindrical shaped body and the ellipsoidal mirror are very well centered with respect to each other and with respect to the travel axis Δ of fiber 1.

The device of the invention is firmly fixed to a bracket parallel to the fiber drawing tower, which allows the relative position of the device to be well adjusted with respect to fiber 1 which is drawn out.

The ellipsoidal mirror is connected to the inside of the tubular shaped body through, for example, the element 25 having the shape of a crown and which is pierced with orifices 13 allowing the gas injected through orifice 12 to flow. Orifice 12 provides ventilation which consists in introducing a neutral gas which flows under the ellipsoidal mirror and leaves through orifices 13 which are spaced apart for example all around the ellipsoidal mirror 4, which provides cooling of the mirror while avoiding pollution of the fiber and uniformizing the gas flow so as not to cause the fiber to move. On the side of the hollow body 10 and in the corresponding part of the cylindrical object 15, there is formed a bore for passing the laser beam 2 therethrough.

The axis of this bore is perpendicular to the travel axis of fiber 1 and situated in a plane perpendicular to the plane of the reflecting surface 11. The reflection may be provided, for example, by a gold layer deposited on this reflecting surface 11 made from copper for example; the copper improves the heat dissipation in cases where a high power is used.

Mirror 3, disposed in a plane perpendicular to the direction of the laser beam, may be a spherical or parabolic mirror. It focuses the light beam 2 from a laser at a point F1. After focussing at F1, the light rays are reflected by the reflecting surface 11 to reach the elliptical mirror 4 and be reflected thereby.

Points F1 and F2 are the two conjugate foci of the elliptical mirror 4. Thus, the rays from F1 converge at F2 which is situated at the lever of fiber 1.

The heated zone situated at F2 has the form of a crown. Because of the aberrations of mirror 3, it may for example have a height of 1 millimeter. The temperature obtained in this zone may be of the order of 1600° C. which is the softening temperature of silica.

Figure 2:
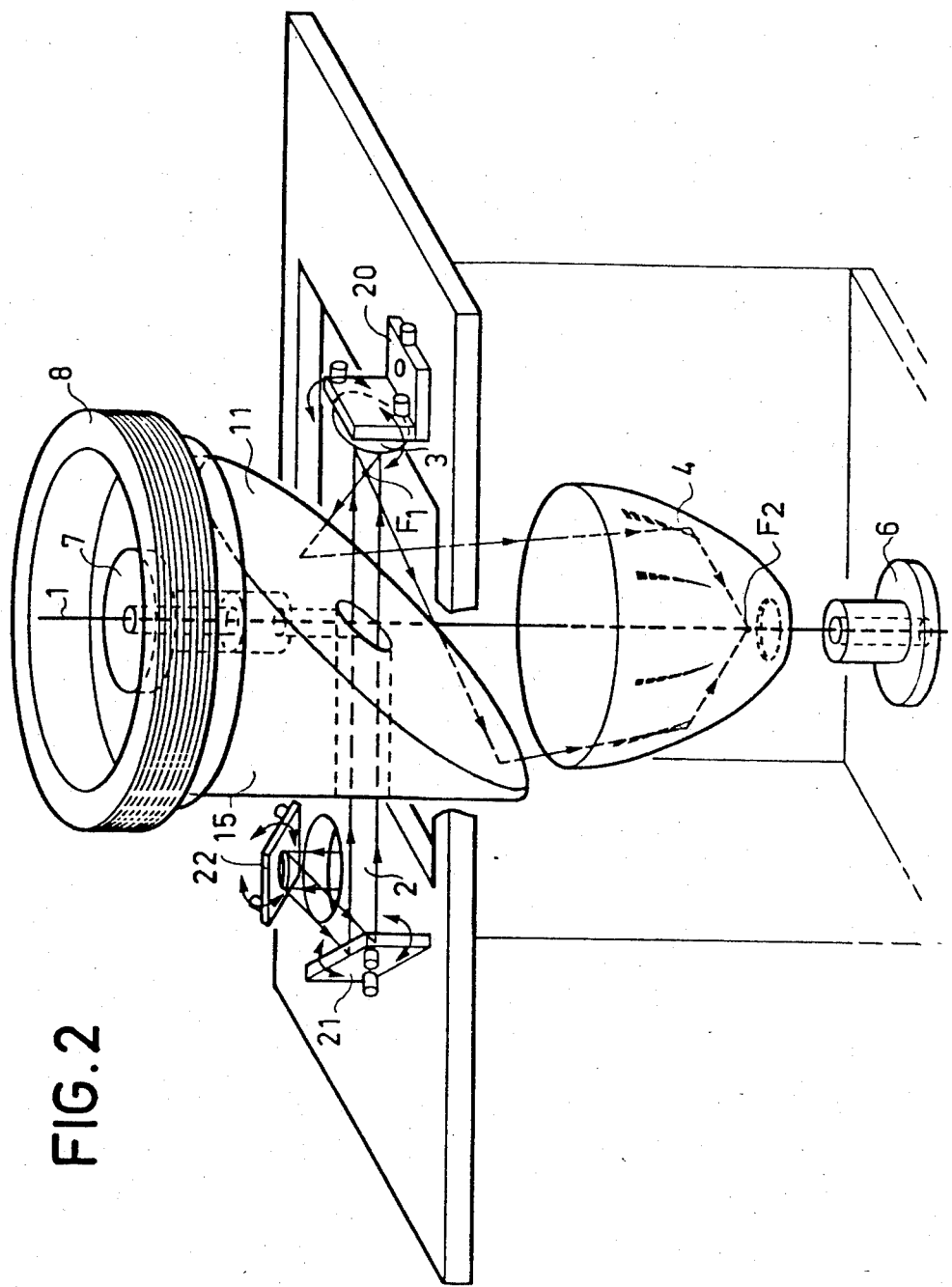
FIG. 2 illustrates two particular aspects of the device of the invention.

As shown in FIG. 2, the alignment mirror 3 is mountd on an adjustment device 20 giving it two degrees of angular adjustment and one degree of longitudinal adjustment, which allows the position of the focussing point of the reflected rays to be adjusted so as to place it in focus F1.

The adjusting devices 21,22 allow the incidence of the laser beam 2 in the device of the invention to be adjusted.

The fiber 1, once the adjustment has been made, must not touch the walls of orifices 6 and 7.

The alignment mirror 3 may be a spherical mirror, but such a mirror has aberrations. Thus, for a beam of 10 mm in diameter and for a mirror with 40 mm in curvature, a spot of 1 mm is obtained at F2 which is due to these aberrations; but in the device of the invention that is not troublesome.

To eliminate this phenomenon and obtain truly pinpoint focussing at F2, a paraboloidal alignment mirror 3 may be used.

Figure 3:
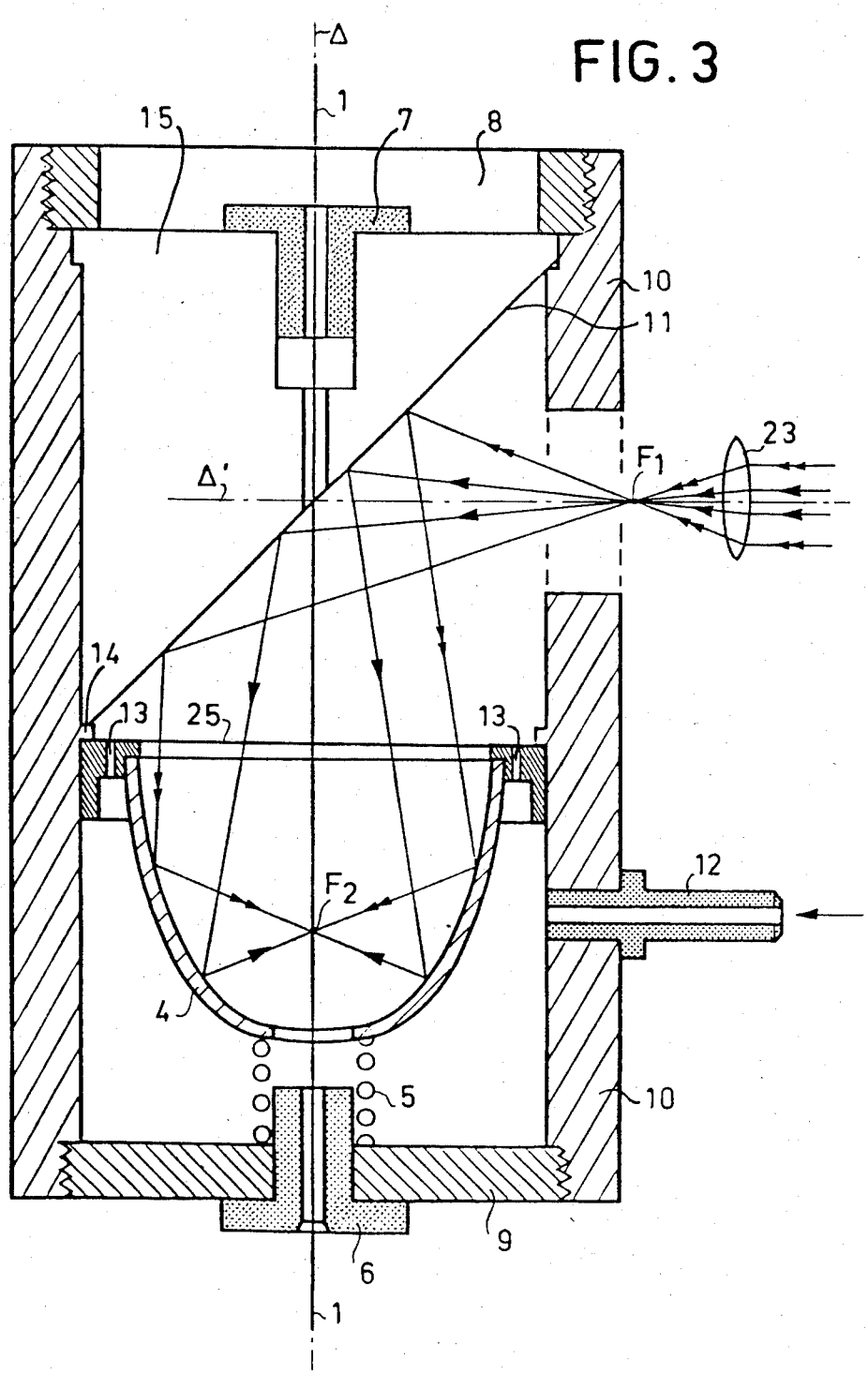
FIG. 3 illustrates a variant of the device of the invention.

In the example of mounting illustrated in FIGS. 1 and 2, the reflecting surface forms an angle of 45° with the travel axis of the fiber but this is not necessary as long as the light beam is collimated at the first focus F1 of the ellipsoidal mirror. The alignment mirror 3 could be replaced by a lens 23 also serving for the alignment, by then placing the laser source on the other side of this lens, as shown in FIG. 3. But the lens then causes power losses of the order of 30% to 40% of the incident power. In addition, the arrangment shown in FIG. 1 allows positioning adjustments to be made by using a laser producing radiation in the visible field, for surface 11 is reflecting whatever the wavelength of the incident radiation; whereas a germanium lens, for example, is opaque to visible rays, and a zinc selenide lens (ZnSe) causes modifications of the index as a function of the wavelength used.

The advantage of using a laser ray for heating the threadlike object is that no other element but the object is heated, which avoids pollution of this object, which exists most particularly with a graphite resistance because of the splattering of graphite.

Figure 4:
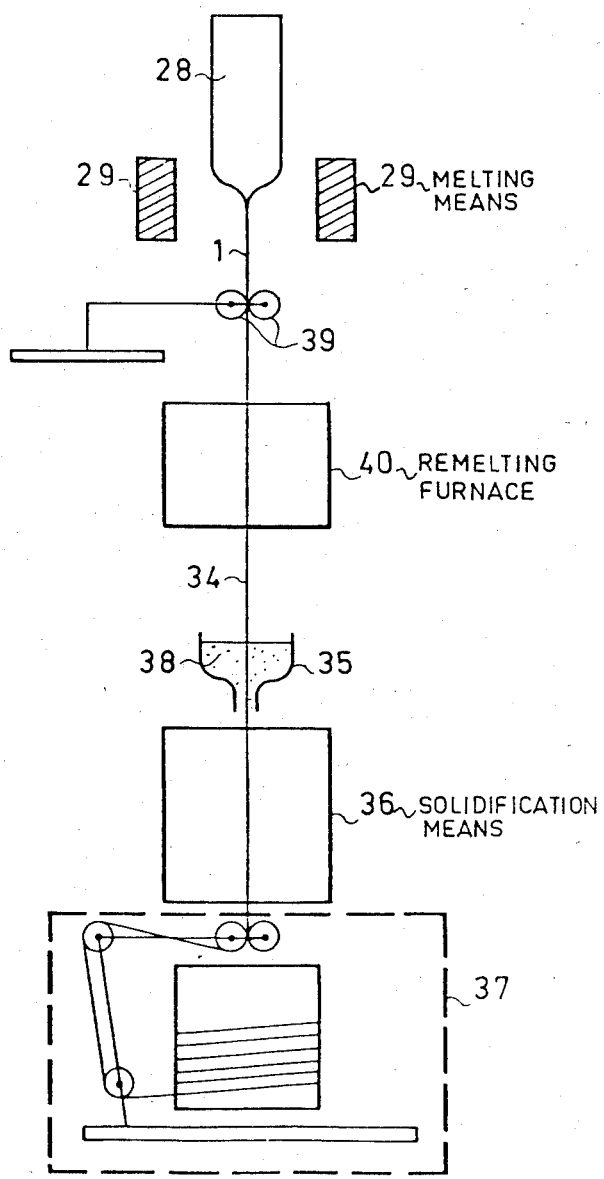
FIG. 4 illustrates a fiber drawing device using the device of the invention.

This device may be used in different apparatus and particularly in the one described in FIG. 4.

This figure illustrates the different elements of a fiber drawing machine using a process for maintaining the circular polarization of an optical fiber.

This process consists in subjecting the fiber to twisting stresses during drawing thereof and in remelting a part of the volume of the fiber situated at the periphery thereof.

This results in releasing the stresses at the periphery whereas they are maintained in the core of the fiber. When the external twisting stresses applied to the fiber are released, the field of the stresses is distributed such that the stresses supported by the periphery are very small. The balance of the stresses in the fiber must be zero. This surface remelting of the fiber is carried out on a fiber without protection, maintained twisted.

The result is such that the central zone is subjected to twisting stresses practically equal to those applied during drawing out, whereas the stresses supported by the remelted part are negligeable. In fact, the integral of the moments of the stresses in each of the zones are in the ratio of the areas of the zones, so very small close to the periphery and very high close to the core. With this remelting process, high stresses are obtained at the core of the fiber at the same time as very low stresses at the periphery of said fiber as well as an absence of residual twist.

This process consists then in twist stressing the fiber and in remelting then the surface thereof while it is under stress. In volume, for example ¾ or 9/10 of the fiber are affected by remelting, the core not being affected thereby; that is to say a central part of about 10 to 20 micrometers is not affected. The material after re-melting remains in place.

The device shown in FIG. 5 is then the device for implementing this process.

The different elements of this device are the following. A preform 8 which is positioned inside melting means 9 which may be a blow-torch, a Joule effect oven, a high, medium or low frequency induction oven, is at the origin of fiber 1. These melting means 9 soften the preform 8. The material beings to flow and a fiber 1 is obtained by drawing and twisting.

The first element after the drawing oven is such that the twist applied to the fiber is not absorbed by the drawing cone. It is a question of pulleys 39 coated with a non-slip material (rubber, silicon) in which the fiber cannot slide. The gantry 17 supplying a twist stress to the fiber is a winding drum. This drum imparts to the fiber a number of twisting turns proportional to the drawing speed, a fiber drawing device allowing the fiber to be drawn and twisted during manufacture thereof.

Then, from the coating device 15 a coat of a protecting material 18 is applied which may be plastic or metal.

The remelting oven 40 may be designed in different ways: it may more especially be the device of the invention.

The remelting depth may be checked by measuring the torque applied by the fiber to the gripping pulleys 39.

What is claimed is:

1. A device for heating an annular surface zone of a threadlike object, comprising:
    a carbon dioxide laser delivering a parallel beam,
    a hollow body having an axis of symmetry and defining an inner enclosure,
    means for causing said threadlike object to travel along a travel axis coaxial with said axis of symmetry,
    a cylindrical object having an axis of symmetry coaxial with said travel axis, said cylindrical object having a bore therethrough along said axis thereof for allowing the threadlike object to travel, said cylindrical object having a slanting bearing surface which is a reflecting surface for the beam from the laser,
    an ellipsoidal mirror disposed at a first end of said hollow body and fixed to the internal walls of said hollow body, said ellipsoidal mirror having an axis of symmetry coaxial with said travel axis, said ellipsoidal mirror having an aperture along said axis thereof to allow said threadlike object to travel, said ellipsoidal mirror defining first and second conjugate foci the second of said foci being situated on the travel axis,
    means for focussing the beam from the laser at the first of said foci of the ellipsoidal mirror, the parallel beam from said laser having a direction perpendicular to the axis of travel of said threadlike object and included in a plane perpendicular to said slanting bearing surface,
    wherein said focussing means comprise a spherical mirror, wherein said hollow body and said cylindrical object define two coaxial cylindrical bores, said bores extending perpendicular to said travel axis and being included in a plane perpendicular to said slanting bearing surface of said cylindrical object, wherein said spherical mirror has an axis of symmetry coaxial with an axis of symmetry of said bores, and wherein said spherical mirror is disposed on a side of the tubular shaped body opposite said laser,
    whereby said beam after focussing by said focussing means and after reflection by said slanting bearing surface and by the walls of said ellipsoidal mirror is focussed at the second of said foci of said ellipsoidal mirror situated on the travel axis of said threadlike object.

2. The device as claimed in claim 1, wherein said focussing means comprise a lens whose axis of symmetry is perpendicular to the travel of axis of said threadlike object and included in a plane perpendicular to said slanting bearing surface, said lens being situated between the laser and the hollow body.

3. The device as claimed in claim 1, wherein said hollow body is a tubular shaped body.

4. The device as claimed in claim 1, wherein said travel means comprise two elements disposed at the two ends of said tubular shaped body each having an orifice situated at the level of the axis of symmetry of this body and which lets the threadlike object travel.

5. The device as claimed in claim 4, wherein said orifices have walls made from tetrafluorethylene.

6. The device as claimed in claim 4, wherein said ellipsoidal mirror rests on a spring fixed to one of said elements.

7. The device as claimed in claim 6, wherein said ellipsoidal mirror is fixed to the internal walls of said tubular shaped body by means of a crown pierced with ventilation holes.

8. The device as claimed in claim 7, wherein said tubular shaped body comprises a ventilation orifice situated between said crown pierced with holes and the element which supports said spring, said orifice receiving a neutral blown gas coming from outside the hollow body.

9. The device as claimed in claim 1, wherein said threadlike object is an optical fiber.

10. A device for heating an annular surface zone of a threadlike object, comprising:
    a carbon dioxide laser delivering a parallel beam,
    a hollow body having an axis of symmetry and defining an inner enclosure,
    means for causing said threadlike object to travel along a travel axis coaxial with said axis of symmetry,
    a cylindrical object having an axis of symmetry coaxial with said travel axis, said cylindrical object having a bore therethrough along said axis thereof for allowing the threadlike object to travel, said cylindrical object having a slanting bearing surface which is a reflecting surface for the beam from the laser,
    an ellipsoidal mirror disposed at a first end of said hollow body and fixed to the internal walls of said hollow body, said ellipsoidal mirror having an axis of symmetry coaxial with said travel axis, said ellipsoidal mirror having an aperture along said axis thereof to allow said threadlike object to travel, said ellipsoidal mirror defining first and second conjugate foci the second of said foci being situated on the travel axis,
    means for focussing the beam from the laser at the first of said foci of the ellipsoidal mirror, the parallel beam from said laser having a direction perpendicular to the axis of travel of said threadlike object and included in a plane perpendicular to said slanting bearing surface,
    wherein said focussing means comprise a parabolic mirror, wherein said hollow body and said cylindrical object define two coaxial cylindrical bores, said bores extending perpendicular to said travel axis and being included in a plane perpendicular to said slanting bearing surface of said cylindrical object, wherein said parabolic mirror has an axis of symmetry coaxial with an axis of symmetry of said bores, and wherein said parabolic mirror is disposed on a side of the tubular shaped body opposite said laser,
    whereby said beam after focussing by said focussing means and after reflection by said slanting bearing surface and by the walls of said ellipsoidal mirror is focussed at the second of said foci of said ellipsoidal mirror situated on the travel axis of said threadlike object.

* * * * *